(12) United States Patent
Yochai et al.

(10) Patent No.: US 6,721,870 B1
(45) Date of Patent: Apr. 13, 2004

(54) PREFETCH ALGORITHM FOR SHORT SEQUENCES

(75) Inventors: Yechiel Yochai, Brookline, MA (US); Sachin More, Marlborough, MA (US); Ron Arnan, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 251 days.

(21) Appl. No.: 09/879,431

(22) Filed: Jun. 12, 2001

(51) Int. Cl.[7] .............................................. G06F 12/00
(52) U.S. Cl. ......................... 711/204; 711/112; 711/213
(58) Field of Search ................................ 711/113, 137, 711/112

(56) References Cited

U.S. PATENT DOCUMENTS

| | | | |
|---|---|---|---|
| 5,381,539 A | 1/1995 | Yanai et al. | 711/133 |
| 5,537,568 A | 7/1996 | Yanai et al. | 711/118 |
| 5,765,213 A * | 6/1998 | Ofer | 711/213 |
| 5,875,453 A * | 2/1999 | Kojima | 711/112 |
| 6,003,114 A | 12/1999 | Bachmat | 711/112 |
| 6,035,375 A | 3/2000 | Yanai et al. | 711/129 |
| 6,275,897 B1 | 8/2001 | Bachmat | 711/114 |
| 6,529,998 B1 | 3/2003 | Yochai et al. | |
| 6,557,079 B1 | 4/2003 | Arnon et al. | 711/137 |

* cited by examiner

Primary Examiner—Reba I. Elmore
(74) Attorney, Agent, or Firm—Daly, Crowley & Mofford, LLP

(57) ABSTRACT

A prefetch process that generates prefetch tasks for short sequences that are no longer than n tracks in length. The value of n is selected as 8. The prefetch process maintains a history of short sequences, uses that history to predict an expected length of a current sequence and generates a short prefetch task based on that prediction. The historical short sequence data is stored in histograms, each histogram being associated with a different logical volume. The histograms store a cumulative count of sequence occurrences of a given sequence length for each sequence length in a range of 1 track to n tracks. The process applies a probability-based threshold to its prediction to control the aggressiveness of the prefetch task to be generated. The threshold is adjusted based on system activity level metrics, such as processor utilization and average memory access time.

18 Claims, 13 Drawing Sheets

| CURRENT LENGTH | EXPECTED LENGTH | | | | | | |
|---|---|---|---|---|---|---|---|
| | 2 | 3 | 4 | 5 | 6 | 7 | 8 |
| 1 | 1 | 1 | 1 | 0.4 | 0.4 | 0 | 0 |
| 2 | | 1 | 1 | 0.4 | 0.4 | 0 | 0 |
| 3 | | | 1 | 0.4 | 0.4 | 0 | 0 |
| 4 | | | | 0.4 | 0.4 | 0 | 0 |
| 5 | | | | 0 | 1 | 0 | 0 |
| 6 | | | | | | 0 | 0 |

| CURRENT | EXPECTECT LENGTH PROBABILITY | | | | | | |
|---|---|---|---|---|---|---|---|
| LENGTH | 2 | 3 | 4 | 5 | 6 | 7 | 8 |
| 1 | 1 | 0.75 | 0.75 | 0.75 | 0.75 | 0.5 | 0.5 |
| 2 |  | 0.75 | 0.75 | 0.75 | 0.75 | 0.5 | 0.5 |
| 3 |  |  | 1 | 1 | 1 | 0.67 | 0.67 |
| 4 |  |  |  | 1 | 1 | 0.67 | 0.67 |
| 5 |  |  |  |  | 1 | 0.67 | 0.67 |
| 6 |  |  |  |  |  | 0.67 | 0.67 |
| 7 |  |  |  |  |  |  | 1 |

PREFETCH ALGORITHM FOR SHORT SEQUENCES

BACKGROUND OF THE INVENTION

The invention relates generally to data prefetching operations in data storage systems.

A typical data prefetching operation makes two important decisions. First, it determines when a prefetch task should be initiated. Second, it determines how much data the prefetch task should prefetch from storage. One known approach to prefetching determines that a prefetch task begin when a sequence of a certain length (i.e., a sequence satisfying a predetermined tail parameter) is observed. Once prefetch activity has commenced, it attempts to remain ahead of the requesting host by a margin that is based on the number of prefetched tracks that are actually used by the host.

Such an approach is not well suited to handling short sequences, however. Because a short sequence has a very short lifetime, prefetch activity for a short sequence cannot afford to wait for a sequence to be formed. Rather, to be effective in those instances, it needs to begin early in the sequence.

SUMMARY OF THE INVENTION

In one aspect of the invention, prefetching data from a storage device includes maintaining a history of sequences and determining an amount of data to be prefetched from a storage device for a new I/O request using the history of the sequences.

Embodiments of the invention may include one or more of the following features.

The history of sequences can comprise at least one histogram having n count fields, each for storing a count value for a corresponding sequence length in a range of 1 track to n tracks and the count value indicating a number of occurrences of sequences of the corresponding sequence length. There can be one histogram per logical volume.

Maintaining the histogram can include observing completion of a sequence of a given sequence length and incrementing the count value in any of the count fields for which the corresponding sequence length is less than or equal to the given sequence length.

Determining the amount of data to be prefetched can include predicting that a current sequence of a current sequence length will reach a next sequence length by computing a probability as a ratio of the count value for the corresponding sequence length that equals the next consecutive sequence length and count value for the corresponding sequence length that equals the current sequence length. It can further include applying a threshold to the prediction. Applying the threshold to the prediction can include comparing the threshold to the prediction determining if the probability is less than the threshold. The prediction and threshold application are repeated for each next sequence length until it is determined for such next sequence length that the probability is less than the threshold. A prefetch amount equal to such next sequence length minus the current sequence length is returned when the results of the comparison indicate that the probability is less than the threshold.

The threshold can be adjusted based on system activity metrics. The system activity metrics can include processor utilization and average memory access time.

The value of '8' can be selected for n.

One or more aspects of the invention may include one or more of the following advantages. Unlike prior prefetch mechanisms that wait to see a sequence of a predetermined length before creating a prefetch task, the prefetch mechanism of the present invention enables a prefetch task to begin as soon as a new read request arrives, thus providing for higher cache hit ratios and read response times for short sequences. In addition, the prefetch mechanism adjusts itself with changing system activity levels (or load conditions) so that prefetching is as aggressive as possible without having an adverse impact on overall system performance.

Other features and advantages of the invention will be apparent from the following detailed description and from the claims.

DETAILED DESCRIPTION

Figure 1:
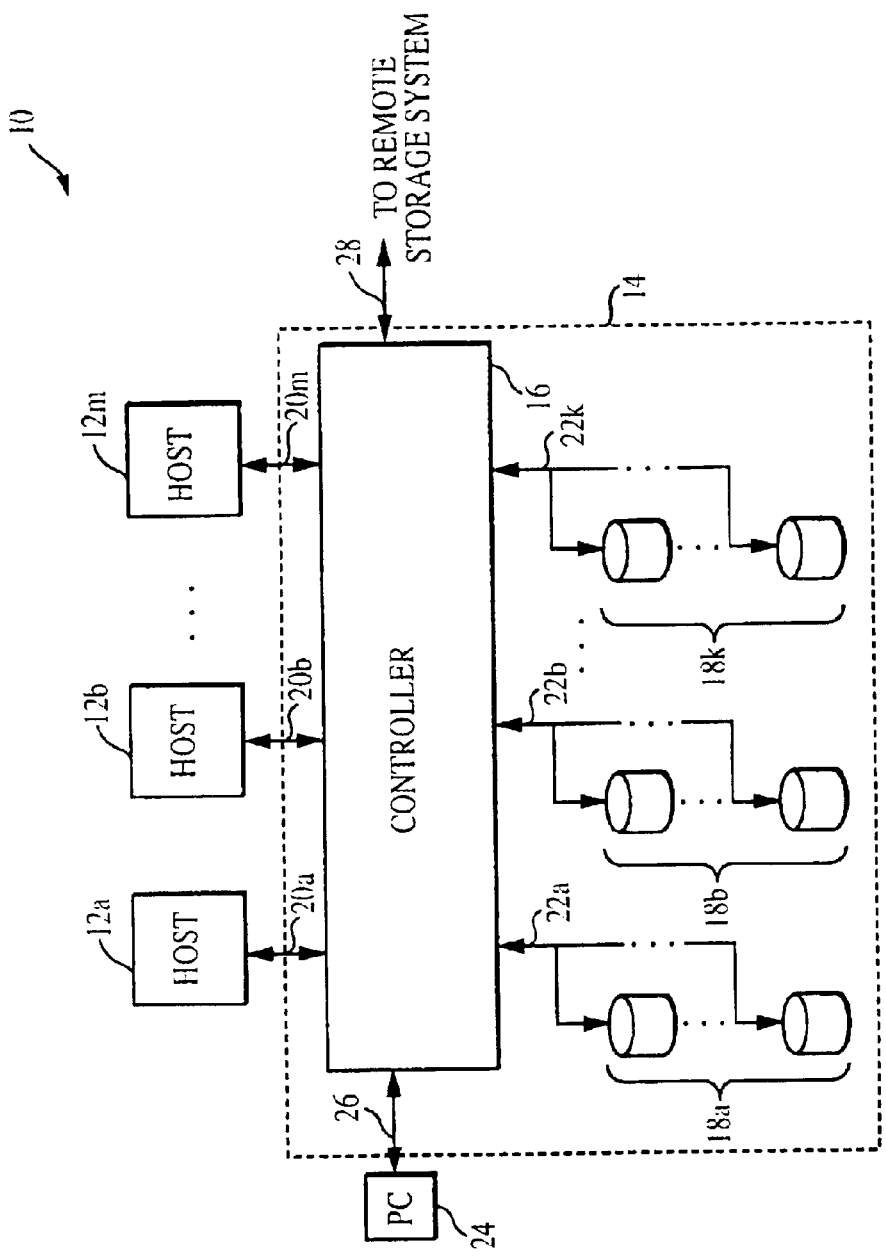
FIG. 1 is block diagram of a data processing system.

Referring to FIG. 1, a data processing system 10 includes host computers 12a, 12b, . . . , 12m, connected to a data storage system 14. The data storage system 14 receives data and commands from, and delivers data and responses to, the host computers 12. The data storage system 14 is a mass storage system having a controller 16 coupled to pluralities of physical storage devices shown as disk devices 18a, disk devices 18b, . . . , disk devices 18k. Each of the disk devices 18 is logically divided, in accordance with known techniques, into one or more logical volumes.

The controller 16 interconnects the host computers 12 and the disk devices 18, and can be, for example, that made by EMC and known as the Symmetrix controller. The controller 16 thus receives memory write commands from the various host computers over buses 20a, 20b, ..., 20m, respectively, for example, connected and operated in accordance with a SCSI protocol, and delivers the data associated with those commands to the appropriate devices 18a, 18b, ..., 18k, over respective connecting buses 22a, 22b, ..., 22k. Buses 22 also operate in accordance with a SCSI protocol. Other protocols, for example, Fibre Channel, could also be used for buses 20, 22. The controller 16 also receives read requests from the host computers 12 over buses 20, and delivers requested data to the host computers 12, either from a cache memory of the controller 16 or, if the data is not available in cache memory, from the disk devices 18.

In a typical configuration, the controller 16 also connects to a console PC 24 through a connecting bus 26. The console PC 24 is used for maintenance and access to the controller 16 and can be employed to set parameters of the controller 16 as is well known in the art. The controller 16 may be connected to another, remote data storage system (not shown) by a data link 28.

Figure 2:
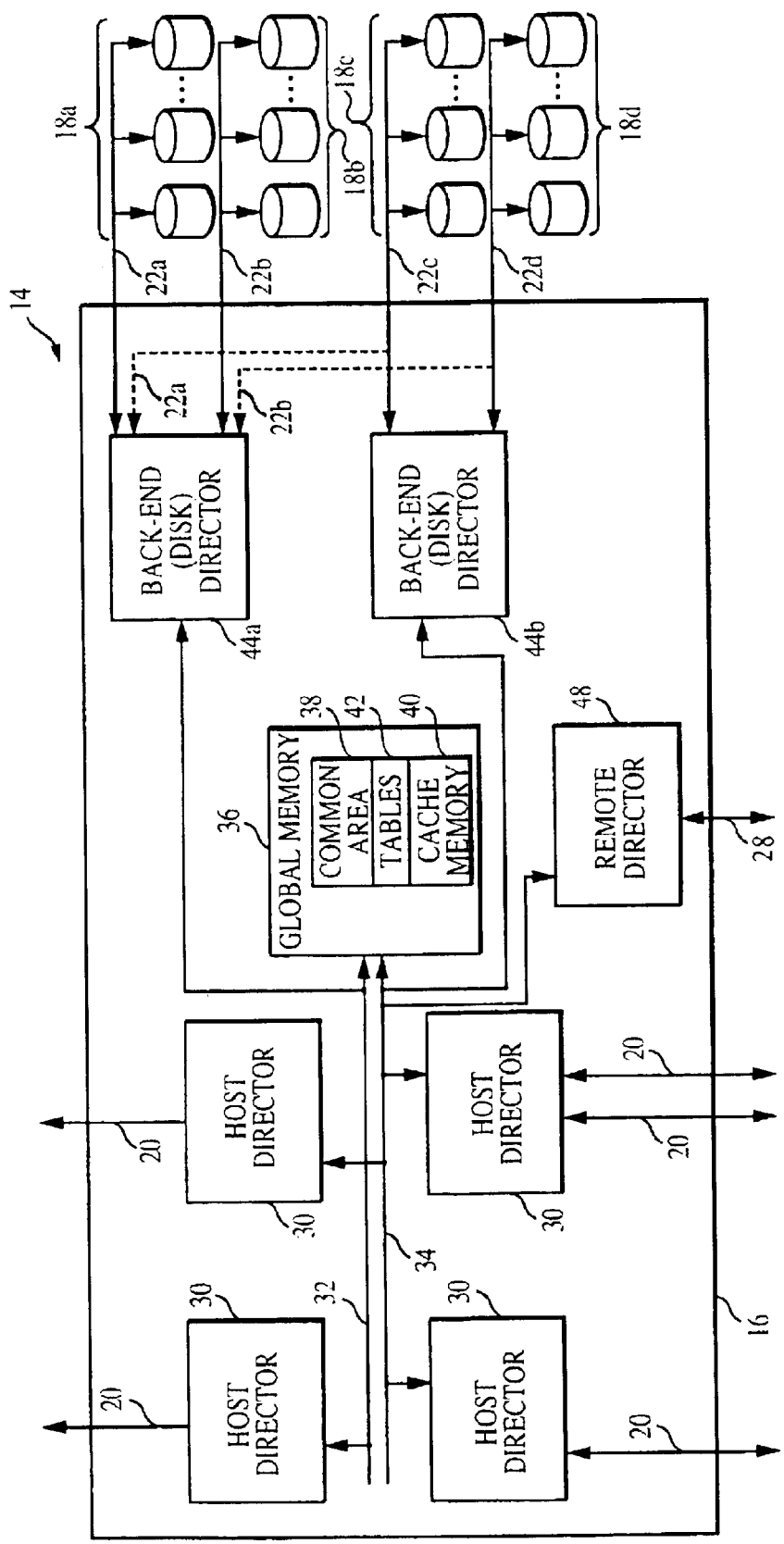
FIG. 2 is a detailed block diagram of the data storage system and its storage controller (shown in FIG. 1).

In operation, the host computers 12a, 12b, ..., 12m, send, as required by the applications they are running, commands to the data storage system 14 requesting data stored in the logical volumes or providing data to be written to the logical volumes. Referring to FIG. 2, and using the EMC Symmetrix controller as an illustrative example, details of the internal architecture of the data storage system 14 are shown. The communications from the host computer 12 typically connect the host computer 12 to a port of one or more host directors 30 over the SCSI bus lines 20. Each host director, in turn, connects over one or more system buses 32 or 34 to a global memory 36. The global memory 36 is preferably a large memory through which the host director 30 can communicate with the disk devices 18. The global memory 36 includes a common area 38 for supporting communications between the host computers 12 and the disk devices 18, a cache memory 40 for storing data and control data structures, and tables 42 for mapping areas of the disk devices 18 to areas in the cache memory 40.

Also connected to the global memory 36 are back-end (or disk) directors 44, which control the disk devices 18. In the preferred embodiment, the disk directors are installed in the controller 16 in pairs. For simplification, only two disk directors, indicated as disk directors 44a and 44b, are shown. However, it will be understood that additional disk directors may be employed by the system.

Each of the disk directors 44a, 44b supports four bus ports. The disk director 44a connects to two primary buses 22a and 22b, as well as two secondary buses 22a' and 22b'. The buses are implemented as 16-bit wide SCSI buses. As indicated earlier, other bus protocols besides the SCSI protocol may be used. The two secondary buses 22a' and 22b' are added for redundancy. Connected to the primary buses 22a, 22b, are the plurality of disk devices (e.g., disk drive units) 18a and 18b, respectively. The disk director 44b connects to two primary buses 22c and 22d. Connected to the primary buses 22c, 22d are the plurality of disk devices or disk drive units 18c and 18d. Also connected to the primary buses 22c and 22d are the secondary buses 22a' and 22b'. When the primary bus is active, its corresponding secondary bus in inactive, and vice versa. The secondary buses of the disk director 44b have been omitted from the figure for purposes of clarity.

Like the host directors 30, the disk directors 44 are also connected to the global memory 36 via one of the system buses 32, 34. During a write operation, the disk directors 44 read data stored in the global memory 36 by a host director 30 and write that data to the logical volumes for which they are responsible. During a read operation and in response to a read command, the disk directors 44 read data from a logical volume and write that data to global memory for later delivery by the host director to the requesting host computer 12.

As earlier mentioned, the data storage system 14 may be remotely coupled to another data storage system 14 via the data link 28. The remote system may be used to mirror data residing on the data storage system 14. To support such a configuration, the data storage system 14 can include a remote director 48 to connect to the data line 28 and handle transfers of data over that link. The remote director 48 communicates with the global memory 36 over one of the system buses 32, 34.

Figure 3:
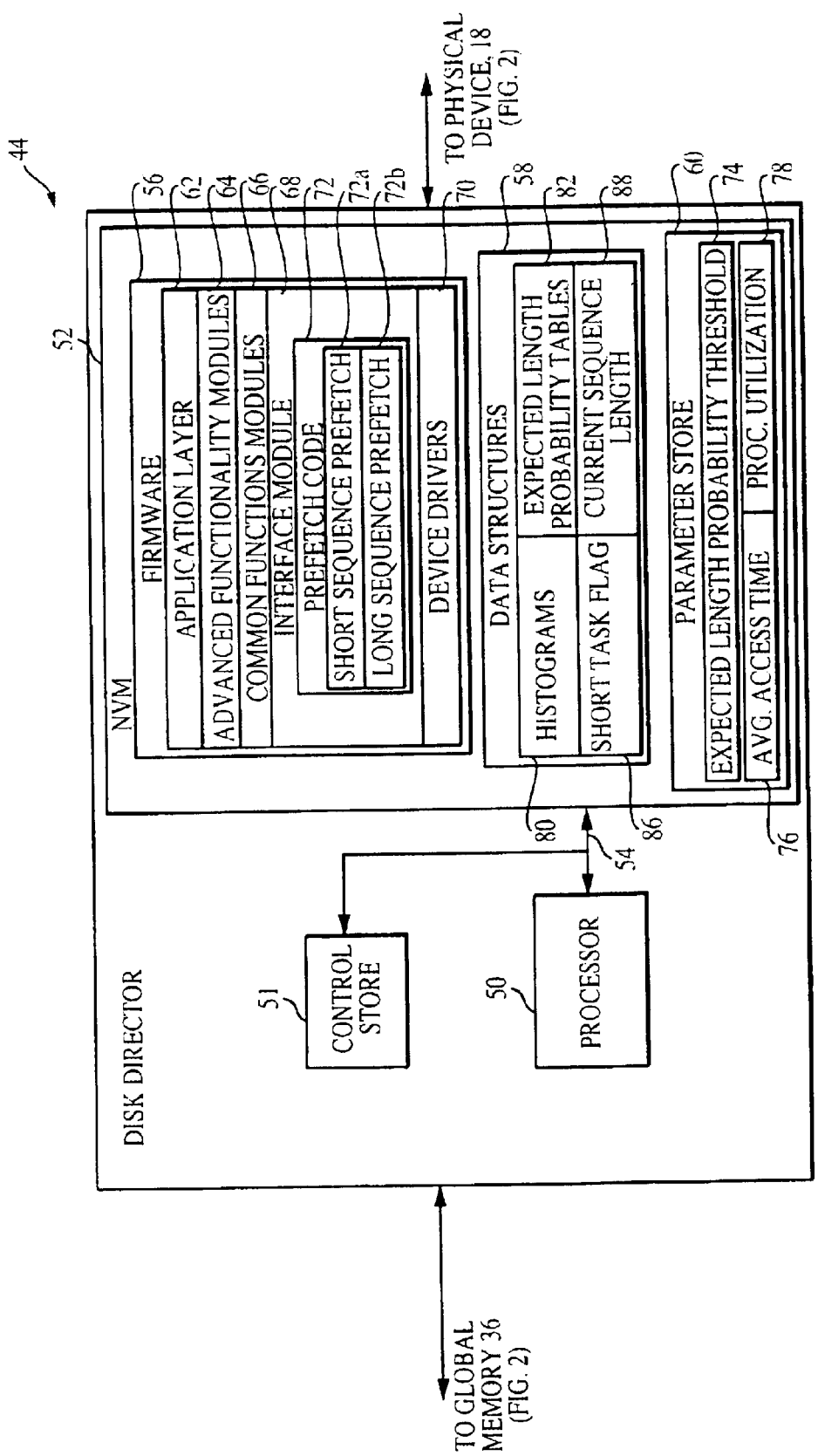
FIG. 3 is a block diagram of a "director" employed by the storage controller (shown in FIG. 2) to control back-end activities and configured to support a prefetch process that includes a short sequence prefetch mechanism to handle data prefetching for short I/O request sequences using sequence history data in the form of histograms to predict sequence lengths.

As shown in FIG. 3, the directors 30, 44 and 48 (represented in the figure by the director 44) include a processor 50 coupled to a control store 51 and a local, nonvolatile memory (NVM) 52 by an internal bus 54. The processor 50 controls the overall operations of the director 44 and communications with the memories 51 and 52. The local memory 52 stores firmware (or microcode) 56, data structures 58, as well as parameter/variable data in a parameter store 60.

The firmware 56, data structures 58 and parameter store 60 are read each time the data storage system 14 is initialized. The microcode 56 is copied into the control store 51 at initialization for subsequent execution by the processor 50.

The components of the director microcode 56 include the following: a system calls/host application layer 62; advanced functionality modules 64, which may be optional at the director level or even at the data storage subsystem level; common function modules 66, which are provided to each director; an interface module 68; and one or more physical transport (or device) drivers 70. Interface modules exist for each of the different types of directors that are available based on connectivity and/or function and thus define the director functionality. Specifically, for the disk director 44, the interface module 68 is a disk interface module. That is, a director that has been loaded with the disk interface code 68 is thus programmed to serve as the disk director 44 or one of disk directors 44 (when more than one is present in the system). As such, it is responsible for controlling back-end operations of the controller 16.

The common function modules 66 includes a number of processes executed by the processor 50 to control data transfer between the host computer 12, the global memory 36 and the disk devices 18, e.g., a cache manager having routines for accessing the cache memory 40 and associated tables 42.

Referring back to FIG. 2, the cache memory 40 operates as a cache buffer in connection with storage and retrieval operations, in particular caching update information provided by the host director 30 during a storage operation and information received from the storage devices 18 which may be retrieved by the host director 30 during a retrieval operation. The tables 42 are used to store metadata associated with the cached data stored in the cache memory 40.

The cache memory 40 includes a plurality of storage locations, which are organized in a series of cache slots. Typically, each cache slot includes a header and data portion that contains data that is cached in the cache slot 80 for a track with which the cache slot is associated, i.e., a track identified by the header.

The tables 42 operate as an index for the cache slots in the cache memory 40. They include a cache index table for each of the storage devices 18a, 18b, ..., 18k, in the data storage system 12. Each cache index table includes device header information, for example, selected identification and status information for the storage device 18 associated with the table. In addition, each cache index table includes cylinder descriptors and each cylinder descriptor includes track descriptors for each track in the cylinder. Each track descriptor includes information for the associated track of the storage device, including whether the track is associated with a cache slot, and, if so, an identification of the cache slot with which the track is associated. Preferably, each track descriptor includes a "cached" flag and a cache slot pointer. The cached flag, if set, indicates that the track associated with the track descriptor is associated with a cache slot. If the cached flag is set, the cache slot pointer points to one of the cache slots, thereby associating the track with the respective cache slot. If the cached flag is set, information from the track is cached in the cache slot identified by the cache slot pointer for retrieval by one or more of the host directors 20.

As described above, and referring back to FIGS. 1 and 2, the host director 30 typically performs storage (or write) and retrieval (or read) operations in connection with information that has been cached in the cache memory 40, and the disk directors 44 performs operations to transfer information in the storage devices 18 to the cache memory 40 for buffering and to transfer information from the cache memory 40 to the storage devices 18 for storage.

Generally, the host director 30, during a read operation, attempts to retrieve the information for a particular track from the cache memory 40. However, if the condition of the cached flag associated with that track indicates that the information is not in the cache memory 40 (in other words, a cache miss has occurred), it will enable the disk director 44 which controls the storage device 18 that contains the information to retrieve the information from the track which contains it and transfer the information into a cache slot in the cache memory 40. Once the disk director 44 has performed this operation, it updates the tables 42 to indicate that the information from the track resides in a cache slot in the cache memory 40, in particular, setting a corresponding cached flag and loading a pointer to the cache slot in the cache slot pointer.

After the disk director 44 has stored the data in the cache memory 33, it notifies the host director 30 that the requested data is available. At some point after receiving the notification, the host director 30 uses the tables 42 to identify the appropriate cache slot and retrieves the requested data from that cache slot.

The disk interface module 68 includes code to support services for read misses, write destaging, RAID, data copy, and other background drive operations. In particular, to optimize performance for read misses, the module 68 includes a read prefetch process 72. The read prefetch process 72 includes two prefetch processes, a short sequence prefetch process 72a and a long sequence prefetch process 72b, both of which are implemented as sequential prefetch mechanisms.

As defined herein, the term "short sequence" refers to an I/O requested sequence of a length in the range of 1 to n tracks, where n is a user-defined parameter stored in the parameter store 60. A "long sequence" refers to any sequence that is longer than n tracks. In the described embodiment, "n" is chosen to be 8; however, other values can be used.

In the preferred embodiment, the so-called long sequence prefetch process 72b is a conventional prefetch process that schedules a prefetch when i) a cache miss has occurred and the previous record resides in cache memory; and ii) all tracks in the "tail" (some number, e.g., 10, of most recent I/O requests) are stored in the cache memory. If these conditions are satisfied, the long sequence prefetch process 72b causes the disk director 44 to perform a prefetch task and ensures that the prefetching activity remains at least some number of tracks ahead of the host I/O requests. The long sequence prefetch process 72b changes the aggressiveness of sequence identification by manipulating a tail parameter. The aggressiveness of the prefetch activity for a sequence is a function of the current sequence length and system load. The long sequence prefetch process 72b is able to identify an unlimited number of sequences, but can handle a limited number at a time. It performs well for long sequences, but the same is not true for shorter sequences.

Exemplary prefetch techniques that may be employed by the long sequence prefetch process 72b are provided in the following: U.S. Pat. No. 5,765,213, in the name of Ofer; U.S. Pat. No. 5,561,464, in the name of Hopkins; U.S. Pat. No. 5,737,747, in the name of Vishlitzky et al.; U.S. Pat. No. 5,887,151, in the name of Raz et al.; all of which are incorporated herein by reference.

In contrast, the aggressiveness of prefetch activity for a sequence using the short sequence prefetch process 72a, depends on system load and history of sequences for I/O requests that have already occurred. The short sequence prefetch process 72a decides whether an I/O request is part of a short sequence based on the history of short sequences seen so far. This allows the process 72a to sometimes predict a short sequence as soon as the disk director 44 sees the first request in the sequence. The size of the short sequence is also predicted based on historical data. The process 72a can therefore program a prefetch task accordingly. Unlike the long sequence prefetch process 72b, which can handle only a limited number of sequences, the short sequence prefetch process 72a is able to identify and handle an unlimited number of short sequences.

The parameter data of the parameter store 60 includes, among other information, an expected length probability threshold 74, which is set to one of two user-configurable parameters, MIN_THRESHOLD and MAX_THRESHOLD, as will be described. Also included are system activity level parameters, including average (global memory) access time parameters 76 and processor utilization parameters 78, which are used by the short sequence prefetch process 72a to adjust the threshold 74 dynamically. Although not shown, the parameter data can further include a threshold manipulation strategy setting to indicate how (or if) the threshold is to be adjusted, as will be described in more detail below, and a prefetch process setting to enable or disable the short sequence prefetch process 72a.

Some of the data structures 58 are also employed by the short sequence prefetch process 72a. They include logical volume sequence histories implemented as histograms 80 and, optionally, expected length probability tables 82 associated with and generated from the histograms 80. Also included are a prefetch task data structure 84, which includes a short prefetch task flag 86 and current sequence length 88 of a short sequence for which the short task indicated by the flag 86 was started.

Figure 4:
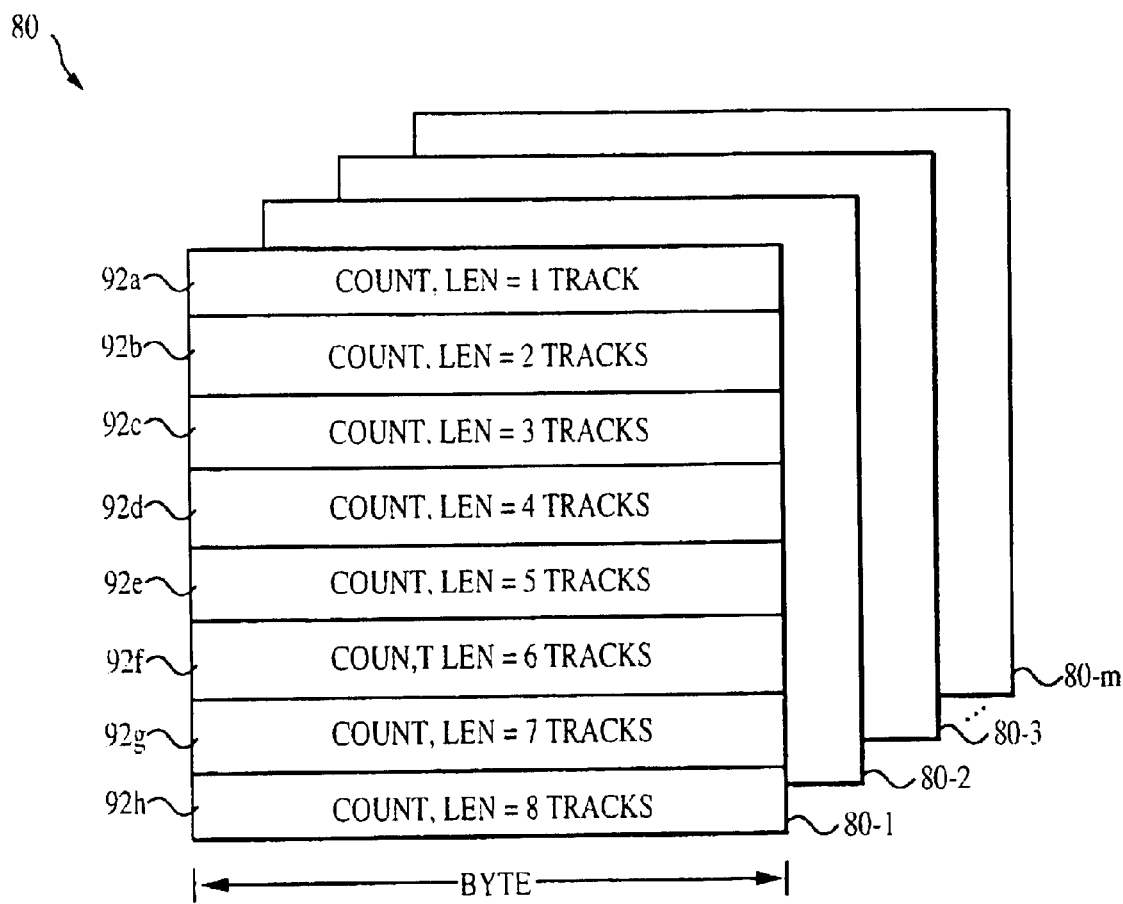
FIG. 4 is a diagram of a histogram data structure used by the prefetch process.

Referring to FIG. 4, the histograms 80, defined by data structures in memory, include histograms 80-1, 80-2, 80-3, ... 80-m, one for each of "m" logical volumes supported by the disk director 44. Each of the histograms 80 includes "n" elements or count fields, fields 92a, 92b, 92c, 92d, 92e, 92f, 92g, 92f, each storing a count value for and corresponding to a different respective one of lengths 1 through 8, where the length ("len") is expressed in terms of number of tracks.

The histograms 80 store a history of short sequences. The count value in the fields 92 indicates the number of sequences of the corresponding length seen so far. Thus, the histogram includes 8 count values or numbers, one each for number of sequences of lengths 1 to 8 seen so far. The counts of sequences stored in each histogram 80 are cumulative. When a new sequence of length "r" is to be added to the history, the appropriate one of the histograms 80 is updated for those of the count fields corresponding to len=1 up through and including len=r. Thus, an r-track sequence is counted r times. If r=4, cumulative count values are updated in the count fields 92a, 92b, 92c and 92d (corresponding to lengths 1, 2, 3 and 4, respectively). When another sequence of length 6 is seen, the histogram count fields 82 are updated for lengths 1, 2, 3, 4, 5, and 6, that is, the count values for count fields 92a through 92f are incremented by one.

Figures 5A, 5B:
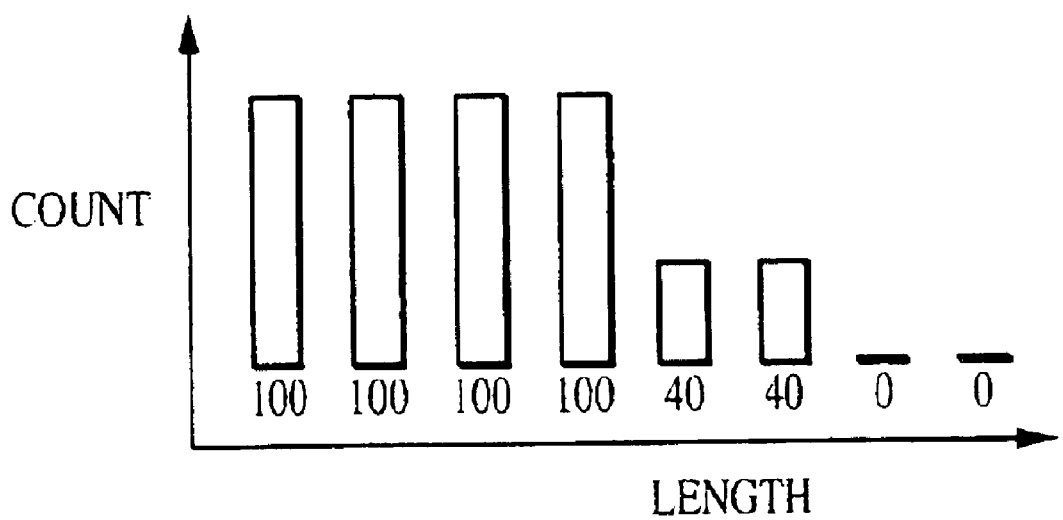
FIG. 5A is a graphical depiction of a histogram example.
FIG. 5B is a table of exemplary expected sequence length probability values for the histogram of FIG. 5A.

The histogram 80 is used to predict future I/O access as follows: if the length of a current sequence is i, then histogram (i+j)/histogram(i) is the expected length probability that the current sequence will reach length i+j. For example, if the back-end has seen 100 sequences, 60 of length 4 and 40 of length 6, the histogram is as shown in FIG. 5A. Thus, when the first I/O is detected, the probability that there will be a new sequence of length of 4 is 1, the probability that there will be a sequence of length 6 is 0.4 and the probability that there will be a sequence of length greater than 6 is zero. Given the current sequence length, the expected length probability that the sequence will reach a certain length is given by the expected length probability table as shown in FIG. 5B.

With reference to the example illustrated in FIGS. 5A and 5B, when the next read arrives, the next three tracks can be fetched with a very high level of confidence. Note that if it is decided at this point that the fifth and sixth tracks will not be prefetched (say, because 40% chances of success are deemed too low), then it does not mean that the sixth track will never be prefetched. If the sequence reaches length 5, then the probability that the sequence will reach length 6 becomes 1 and the sixth track will indeed be prefetched.

Given the current length of a sequence (that is, length seen so far), the expected length probability threshold (hereafter, simply "threshold") 74 (from FIG. 3) is applied to the histogram data to determine the number of tracks to be prefetched. The process 72a tries to fetch maximum number of tracks ahead such that the probability of the farthest track prefetched (from the current track) will be used is higher than the threshold.

Still referring to the example shown in FIGS. 5A and 5B, and assuming the workload continues to exhibit the same characteristics and the threshold 74 is set to '1', then the J results for a 4 track sequence and a 6 track sequence are as follows. For a 4-track sequence, a read miss occurs on the first track and the next three tracks are prefetched. For a 6 track sequence, a read miss occurs on the first track, the next three tracks are prefetched, read miss occurs on the fifth track and the next (sixth) track is prefetched.

For both of these cases, with the threshold 74 set to '1', all prefetched tracks are used. There is one read miss for each 4-track sequence and two read misses for each 6-track sequence.

Now consider the results for a threshold setting of 0.4. For both cases, a read miss occurs on the first track and the next five tracks are prefetched. There are 2 unused tracks for each 4-track sequence, but there is only one read miss for each 4 and 6 track sequence.

Thus, it can be seen that decreasing the value of the threshold results in a higher hit ratio, but also increases the number of unused tracks (which may in turn, depending on the workload, increase response time). Generally, therefore, the threshold value (theoretically 0<threshold<1) controls the aggressiveness of the prefetch task. A lower threshold value indicates a more aggressive behavior. A value of zero indicates a prefetch of the next 7 tracks for any I/O request. In the described embodiment, a single value of threshold is used per DA, but that value is adjusted dynamically according to changing system loads.

Figure 6:
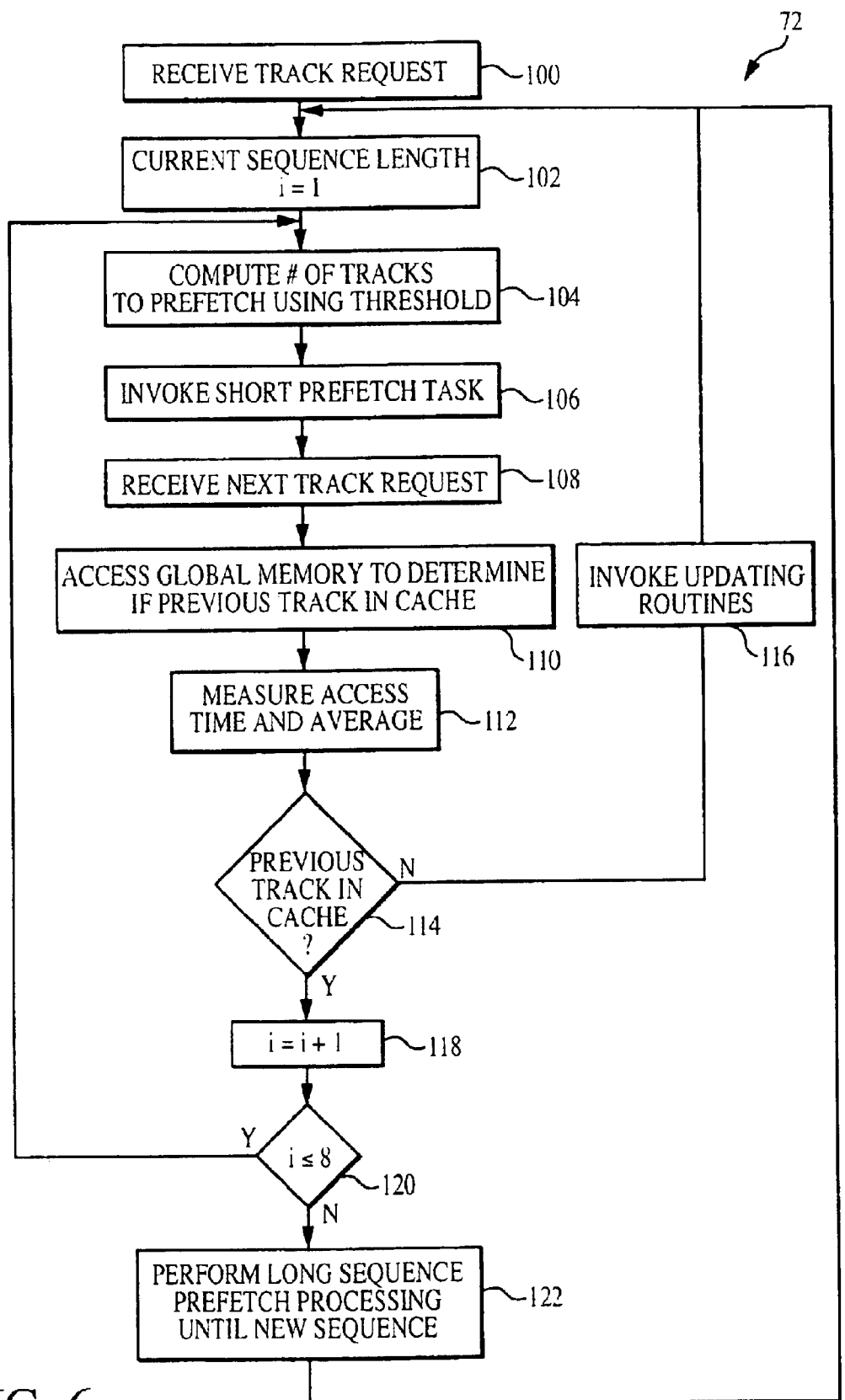
FIG. 6 is a flow diagram of the prefetch process.

An overview of the prefetch process 72 is now described with reference to FIG. 6. The process 72 begins by receiving or detecting an I/O read request for a track on a given logical volume from one of the hosts 12 (FIG. 1) (step 100) in response to a cache miss. The process 72 sets the current sequence length variable "i" to '1' (step 102). The process 72 computes the number of tracks that are to be prefetched from the logical volume (step 104). If the number of tracks is non-zero, the process 72 invokes a short prefetch task to prefetch the computed number of tracks (step 106). The process detects a next track request (step 108) and accesses the global memory to determine if the previous track resides in the cache memory. For a requested track having a track number "p", the previous track is the track having a track number "p−1"). At the same time, the process 72 measures the global memory access time and computes an average access time for values processed thus far (step 112). If, at step 114, the process 72 fails to locate the previous track in the cache memory, the process 72 recognizes that the new track request begins a new sequence. The process 72 then invokes some background data structure and parameter data updating routines (step 116), as will be described with reference to FIG. 7, and returns to step 102.

On the other hand, if the process 72 finds the previous track in cache (at step 114), the process 72 increments the current sequence length i by one (step 118). The process 72 determines if the value of i is less than or equal to n (where n=8) (step 120). If yes, the process 72 returns to step 104 to compute the number of tracks for another short prefetch task. Otherwise, if the current sequence length is 9, the process 72 switches to long sequence prefetch processing until the beginning of a new sequence is detected, at which point the process 72 returns to step 102 to reset the value of the current sequence length variable i.

It will be understood that the long sequence prefetch. processing (step 122) corresponds to the long sequence prefetch process 72b from FIG. 3. The manner in which the long process operates is well known and therefore not described in detail herein. It will be appreciated that the long sequence prefetch process detects new requests, computes prefetch size and start time, invokes long prefetch tasks, determines (via cache metadata, like the short sequence prefetch process) when a sequence has ended and a new sequence begins. Unlike conventional approaches, which would have used the long process for a first sequence and continued to use that process for each subsequent new sequence, the process 72 is configured to include the short sequence prefetch process 72a (from FIG. 3) to handle prefetch activities for sequences of up to 8 tracks in length. Collectively, steps 100 through 120 correspond to the short sequence prefetch process 72a.

Figure 7:
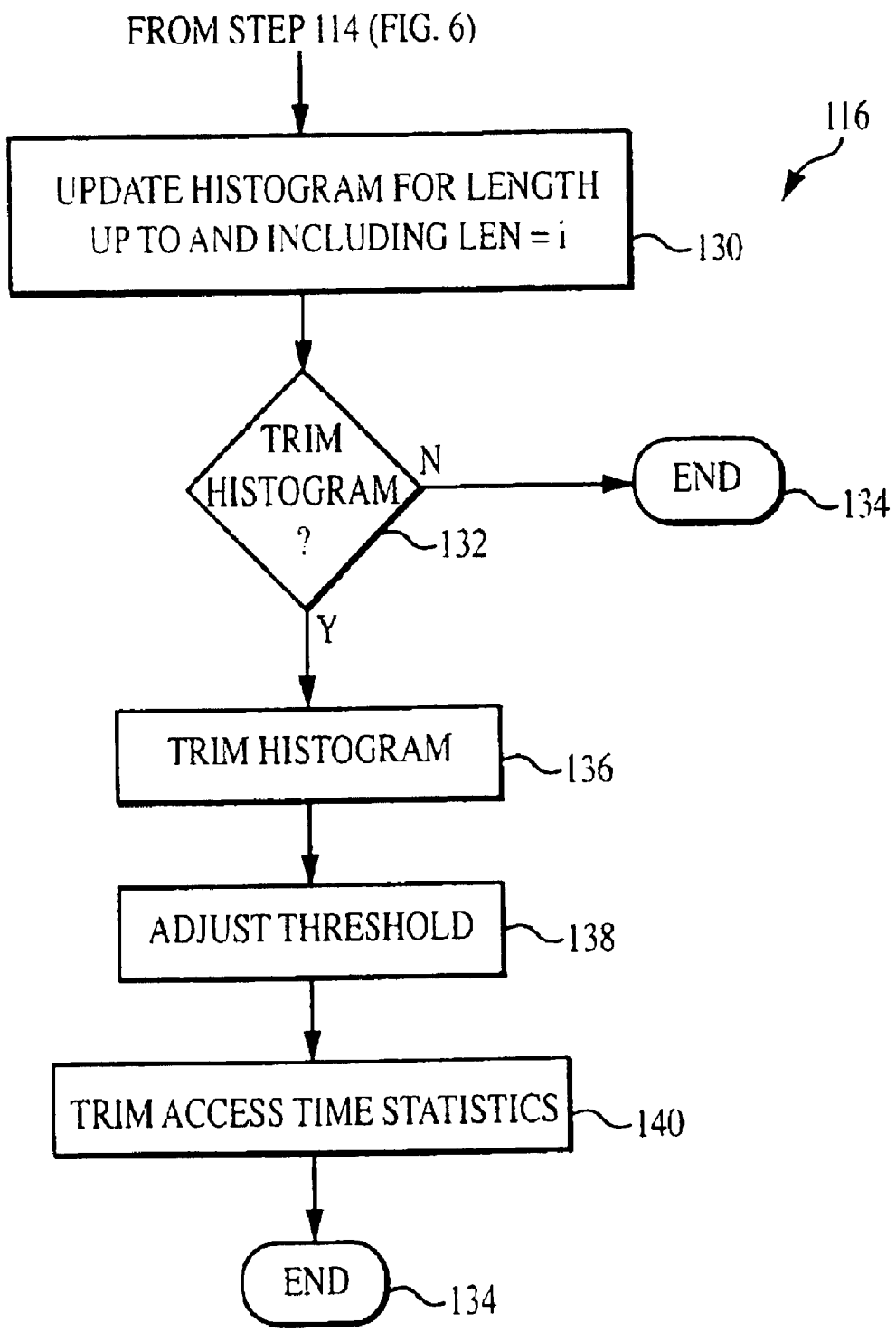
FIG. 7 is a flow diagram of data structures and parameter data updating routines invoked by the prefetch process.

Referring to FIG. 7, the updating operations 116 performs a histogram maintenance activity (step 130) to update the histogram for the length of the sequence that just completed, as reflected in the value of the current sequence length. The process accesses the histogram data structure for the appropriate logical volume and increments the count values corresponding to sequences of up to and including length i.

Referring back to FIG. 4, the histograms 80 provide limited storage capacity for the count elements. In the example shown, each element is stored in a byte and thus cannot exceed 255. Consequently, the histogram values are "trimmed" or adjusted periodically to prevent overflow as well as to reduce the effect of not-so-recent historical data on the prefetch size computation. The histogram is adjusted when the first element of the histogram (which stores the number of sequences of length '1' seen so far, and hence is the biggest element in the histogram) reaches a count threshold value (which is a user configurable value). At that point, each element of the histogram is divided by a number (also a user configurable parameter).

Thus, again referring to FIG. 7, the updating processing step 116 determines if the histogram that has been updated needs to be reduced by comparing the count value in the count field 92a to the count threshold value (step 132). If it does not, the updating activities terminate (step 134). If the count field 92a has reached the count threshold value, then the histogram is trimmed, that is, each count value is divided by the same number, e.g., 4.

In one embodiment, and as illustrated in FIG. 7, following histogram adjustment, the threshold is adjusted (step 138). Also, like the histograms, the access time statistics are sometimes reduced (step 140) (in this case, older values contributing to the average access time are eliminated) to emphasize more recent data. Once the access time statistics have been adjusted, the updating activities terminate.

Figure 8:
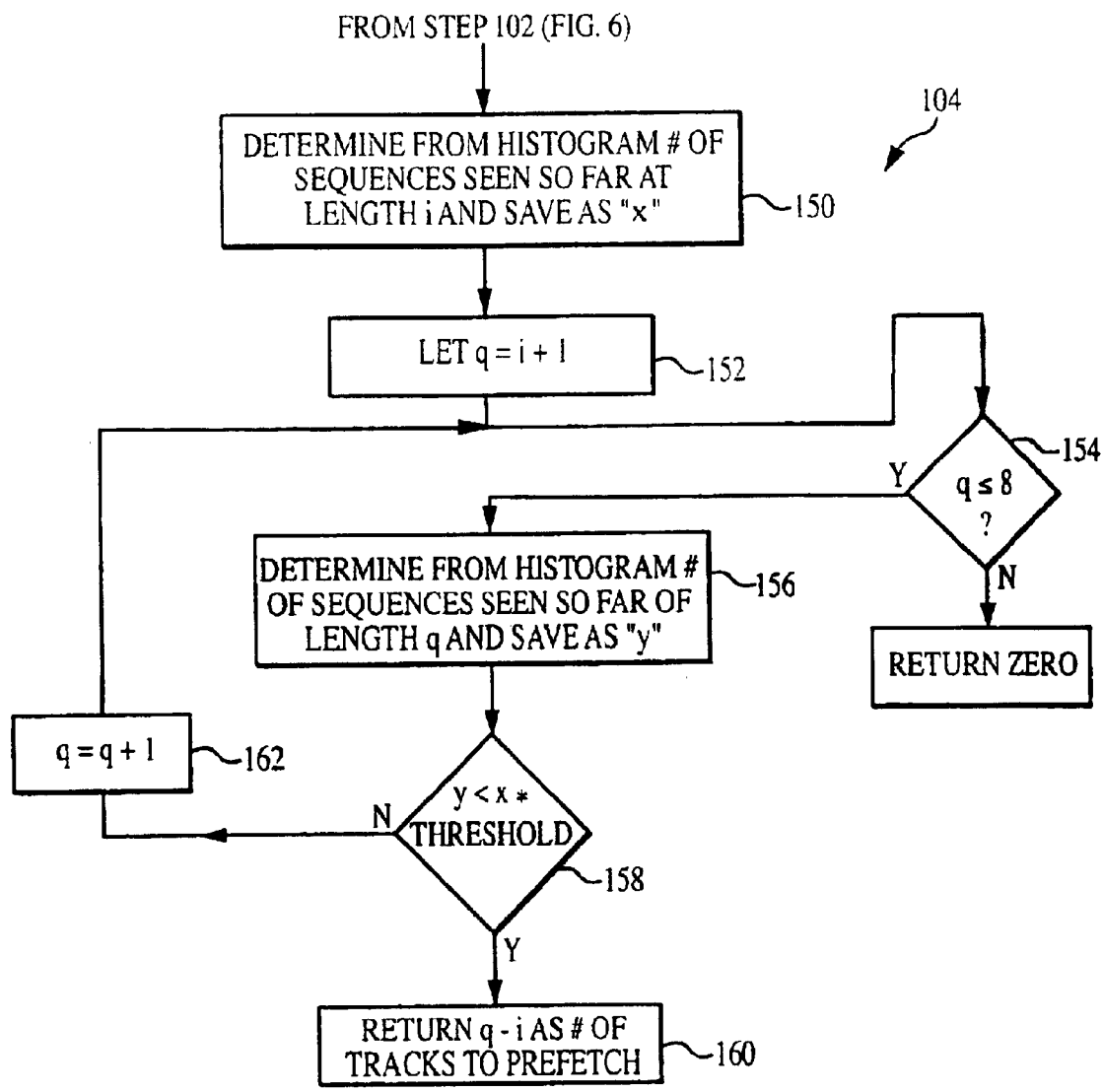
FIG. 8 is a flow diagram of a short prefetch size (number of tracks) computation performed by the prefetch process.

Referring now to FIG. 8, the prefetch size computation 104 determines from the appropriate histogram and count field the number of sequences seen so far of the current length i and stores that number in a variable, e.g., variable "x" (step 150). The computation process 104 determines a next sequence length by incrementing the value of i by one and stores the next sequence length in another variable, e.g., variable "q" (step 152). The process 104 determines if q is less than or equal to 8 (step 154). If it is, the process 104 determines from the same histogram the number of sequences seen so far of length q (by reading the histogram's count field corresponding to the length q) and saves that number in a variable, e.g., variable "y" (step 156). The process 104 determines if the value of y is less than the value of x multiplied by the threshold (step 158). In other words, it compares the expected length probability histogram(q)/histogram(i), or y/x, to the threshold. If y is less (and therefore the probability is less than the threshold), the process 104 subtracts the value of i from the value of q and returns the difference value q−i as the number of tracks to be prefetched in a short prefetch task (step 160). Otherwise, the process 104 increments the value of q by one (step 162) and returns to step 154. If, at step 154, it is determined that the value of q is not less than or equal to eight, then no tracks will be prefetched. That is, the current track request is a read miss and, although the sequence is of length 8 and still qualifies as a short sequence, any prefetching would be based on the expectation that the expected sequence would be greater than eight tracks in length and therefore no longer a short sequence.

As indicated earlier, the prefetch process 72 manipulates the threshold 74 (FIG. 3) based on system activity. The higher the level of system activity, the higher the threshold and vice versa. In the described embodiment, threshold adjustment takes place when the histogram is trimmed. Each disk director 44 adjusts its own threshold only. The adjustment is based on either the disk director processor utilization 78 (FIG. 3) or the average access time 67 (FIG. 3). The processor utilization 78 is based on idle time statistics. If the value is above a maximum allowed utilization level (e.g., 90%), it is assumed that creating more prefetch tasks will affect the processor performance adversely and the threshold 74 is set to a MAX_THRESHOLD value. For a MAX_THRESHOLD value of 100%, a short prefetch task is created only if the chances of success are 100%.

For average global memory access time, assumptions are as follows: i) the average global memory access time is indirectly indicative of the amount of activity in the system; ii) an average global memory access time of less than a lower average access time threshold indicates an idle system for the processor; and iii) an average global memory access time of more than an upper average access time threshold indicates an overloaded system from the point of view of this particular processor. In the described embodiment, the upper threshold is 6 ms and the lower threshold is 3 ms. Of course, other values may be selected based on system implementation and performance factors. The process 72 measures the global memory access time when it checks for the presence of previous tracks (for the current I/O request) in the cache, as was earlier described with reference to FIG. 6. The access time statistics are trimmed when a new threshold value is determined, as indicated earlier with reference to FIG. 7.

Figure 9:
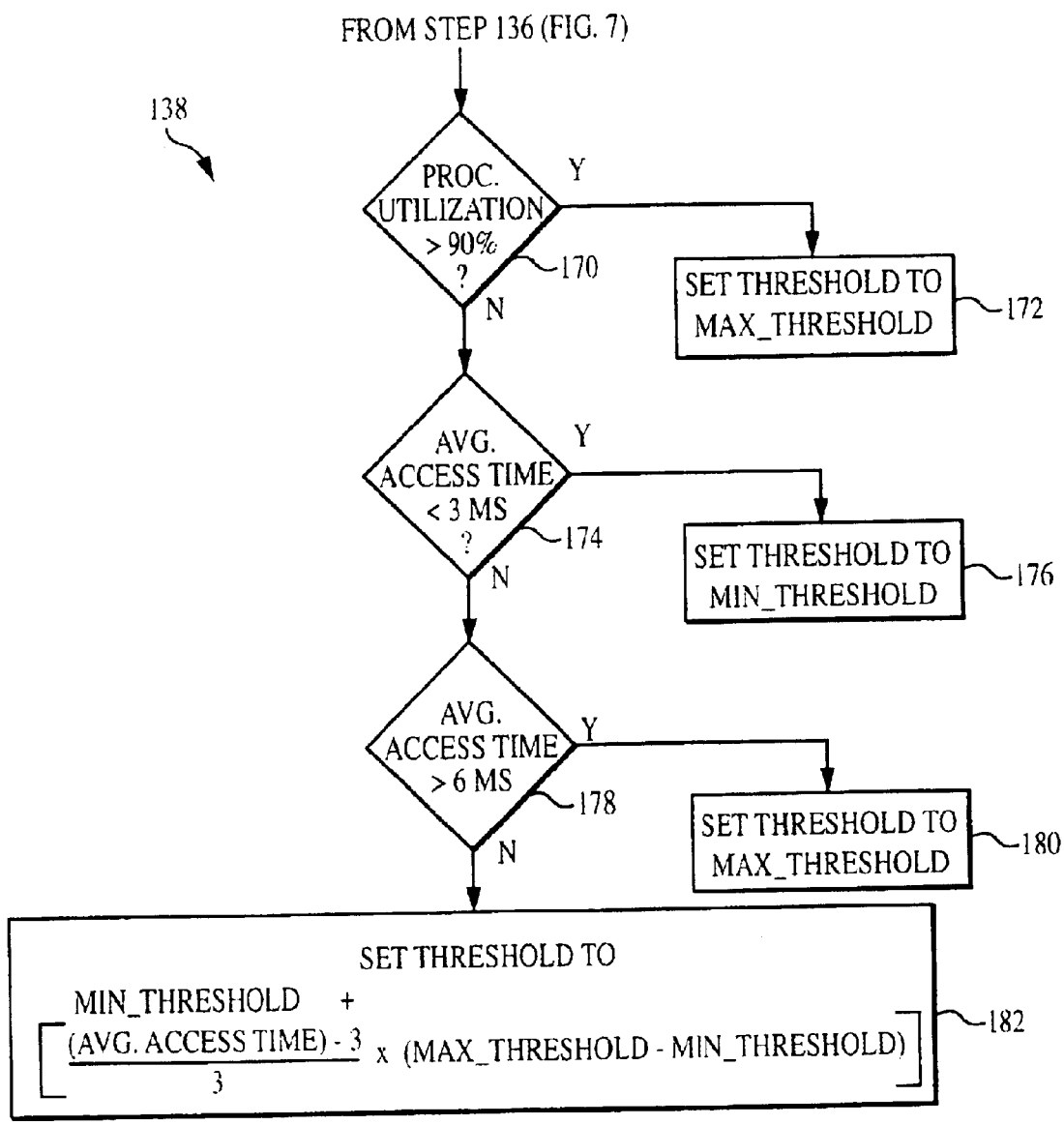
FIG. 9 is a flow diagram of an expected length probability threshold adjustment that can occur as part of the updating routines (shown in FIG. 7).

The value of the threshold 74 varies between two user configurable parameters, MIN_THRESHOLD and MAX_THRESHOLD. Referring to FIG. 9, the threshold computation/adjustment 138 (from FIG. 7) is performed in the following manner. If the processor utilization 78 is above 90%, then the threshold 74 is set to the value of MAX_THRESHOLD (step 172). Otherwise, if the average global memory access time 76 is below 3 ms (step 174), then the threshold 74 is set to the value of MIN_THRESHOLD (step 176). If the average global memory access time 76 is above 6 ms, the threshold 74 is set to the value of MAX_THRESHOLD (step 180). Otherwise, the threshold 74 is computed as MIN_THRESHOLD+[[(average access time)−3]/3×(MAX_THRESHOLD−MIN_THRESHOLD)].

Other schemes can be used to set or adjust the threshold 74. For example, the process 72a can accept a user-defined threshold (as above), but the threshold may be maintained at the same value or may be adjusted based on other system parameters or algorithms, e.g., load balancing.

In yet another alternative scheme, the process 72a can choose a minimum non-zero probability ("global minimum") from the expected sequence length probability table and use that global minimum as the threshold 74. In the exemplary table of FIG. 5B, the value is 0.4. The difference between setting the threshold 74 to zero and a global minimum is that, at the zero threshold, the process 72a always fetches (8−i) tracks, whereas setting the threshold 74 to the global minimum ensures that the process 72a never fetches more than the largest previously seen sequence minus the length of the current sequence.

In yet another alternative threshold adjustment scheme, the process 72a can choose a running minimum from the expected sequence length probability table. The running minimum considers only the probabilities of a sequence extending from length i to i+1 and takes a minimum of those values. The sequence extending probabilities for the table of

FIG. 2 are:

| | |
|---|---|
| 1 to 2 | 1 |
| 2 to 3 | 1 |
| 3 to 4 | 1 |
| 4 to 5 | 0.4 |
| 5 to 6 | 1 |
| 6 to 7 | |
| 7 to 8 | |

Therefore, the running minimum is 0.4. In this example, the global minimum and the running minimum are the same. Generally, however, the running minimum results in less aggressive prefetching.

Figures 10A, 10B:
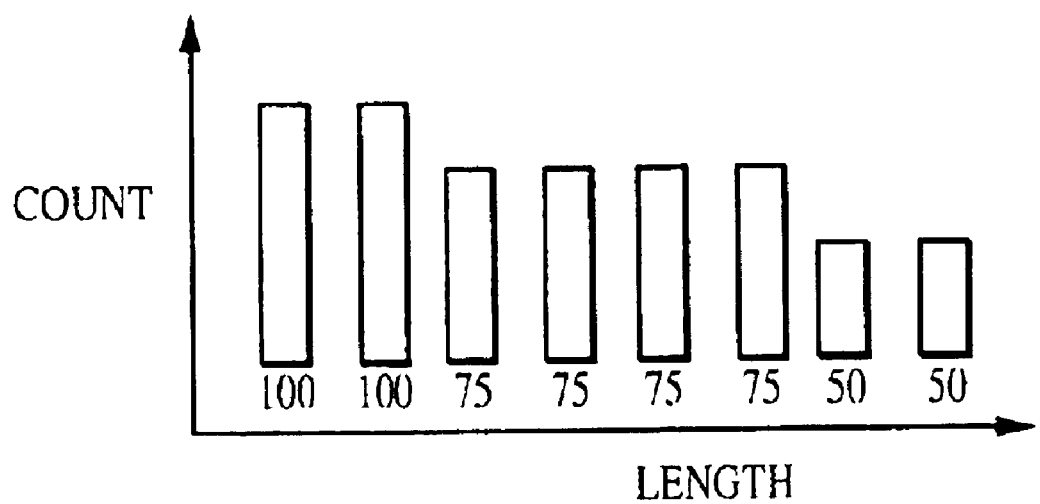
FIG. 10A is a graphical depiction of a second histogram example.
FIG. 10B is a table of exemplary expected sequence length probability values for the histogram of FIG. 10A.

Consider another exemplary histogram shown in FIG. 10A, and associated expected sequence length probabilities table as illustrated in FIG. 10B. For the histogram of FIG. 10A, the global minimum is 5 and the sequence extending probabilities are:

| | |
|---|---|
| 1 to 2 | 1 |
| 2 to 3 | 0.75 |
| 3 to 4 | 1 |
| 4 to 5 | 1 |
| 5 to 6 | 1 |
| 6 to 7 | 0.67 |
| 7 to 8 | 1 |

Thus, the running minimum for this second example is 0.67.

Performance test results for short sequences show that the short sequence prefetch achieves significant improvements in both response time and cache hit ratio over the conventional, long sequence prefetch when the long sequence prefetch is used for short sequences. The improvements in the response time are mainly due to higher cache hit ratio and reduction in number of unused tracks.

Figure 11:
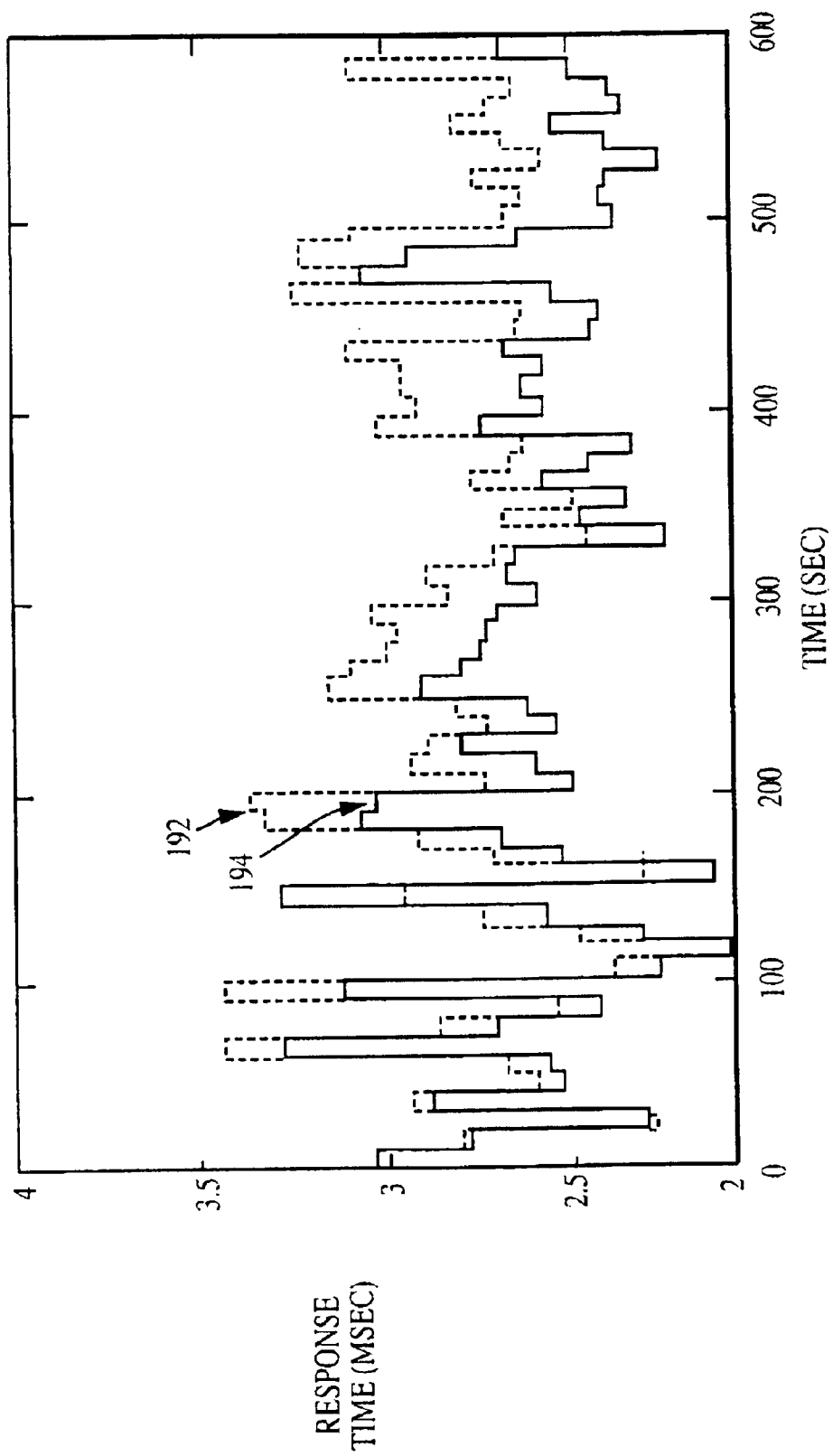
FIG. 11 is a graphical depiction of response time performance results for the prefetch process.
Figure 12A:
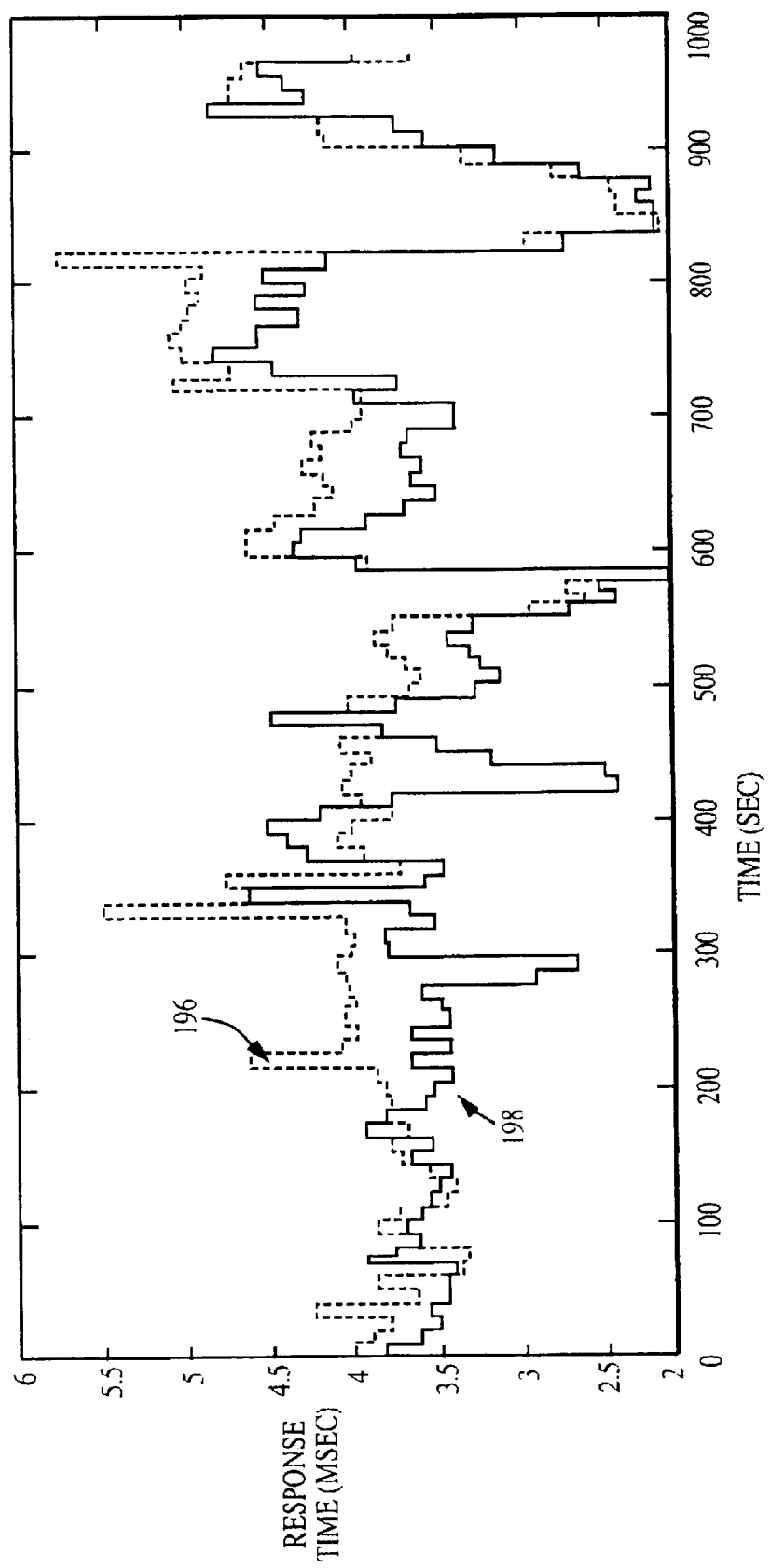
FIGS. 12A and 12B are graphical depictions of response time performance results for the prefetch process for a given I/O rate and twice the given I/O rate, respectively.
Figure 12B:
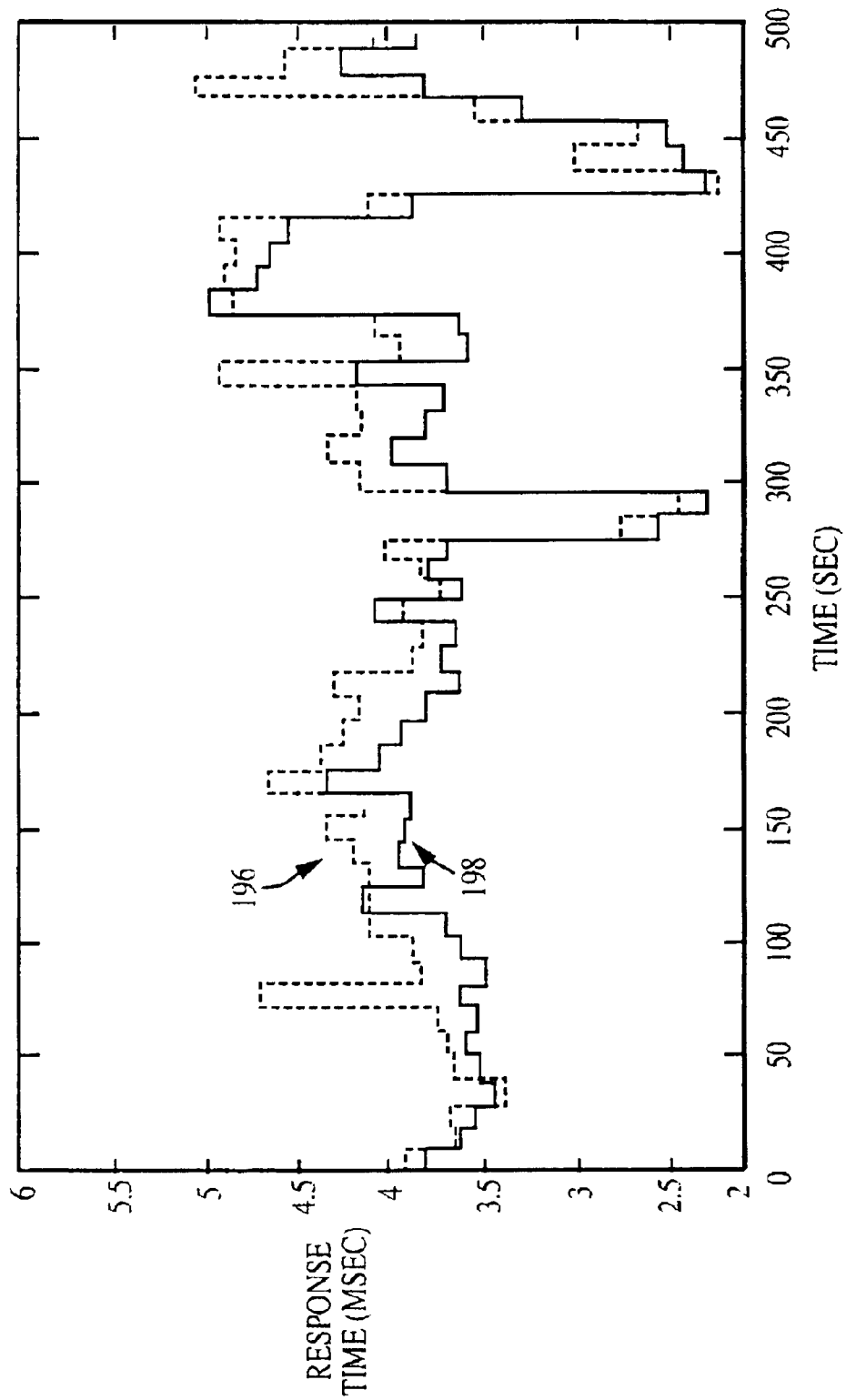

FIGS. 11 and 12A–12B illustrate advantages of employing the above-described short sequence prefetch process 72a as part of the overall prefetch process 72. In particular, the figures illustrate the improvement of the short sequence prefetch process 72a over the long sequence prefetch process 72b (when used for short sequences).

Referring to FIG. 11, a graphical depiction of response time over time illustrates performance results for the long sequence prefetch process 72b (indicated by the reference numeral "192" and represented by dashed lines) and performance results for the process 72 that includes the dynamically adjusting short sequence prefetch process 72a (indicated by the reference number "194" and represented as a solid line). For a given workload (475 I/Os per sec, 71 volumes, 18 mirror pairs at the physical device level), the long process by itself provides a 55% hit ratio and a response time of 2.82619 ms. For the same workload, the process 72 with dynamic threshold adjustment for short sequences provides a 61% hit ratio with a response time of 2.59248 ms. Although not shown on the graph, for this same configuration and workload, the process 72 achieves a 62% hit ratio and a response time of 2.55841 with a fixed threshold of 25%. Collectively, such results demonstrate that the process 72 with threshold adjustment can aggressively prefetch data and achieve close to optimal hit ratio and response time by correctly adjusting the threshold value.

Referring to FIGS. 12A and 12B, graphical depictions of response time over time illustrate performance results for the long sequence prefetch process 72b (indicated by reference number "198" and represented by dashed lines) and performance results when the dynamically adjusting short sequence prefetch process 72a (indicated by reference numeral "200" and represented as a solid line) is used for changing levels of system activity. FIG. 12A illustrates a system with a given workload operating at a given speed. FIG. 12B illustrates results for the same system/workload, but operating at twice the speed (and therefore increased system activity). The workload exercises 48 different logical volumes spread across 12 disk pairs. The I/O rate varies from 334 I/Os per second to 668 I/Os per second. The process 72 improves the hit ratio from 49 to 58% and improves the response time by 10%. When the same workload run at twice the speed, the process curbs its aggressiveness somewhat. At even higher I/O rates (e.g., 16× speed, not shown), its performance becomes very similar to that of the long sequence prefetch process.

Other embodiments are within the scope of the following claims.

What is claimed is:

1. A computer program product residing on a computer readable medium for prefetching data from a storage device, comprising instructions for causing a computer to:

maintain a history of sequences;

determine an amount of data to be prefetched from a storage device for a new I/O request using the history of sequences, the history of sequences comprising at least one histogram and the at least one histogram includes n count fields each for storing a count value for a corresponding sequence length in a range of 1 track to n tracks, the count value indicating a number of occurrences of sequences of the corresponding sequence length; and the at least one histogram comprising a plurality of histograms and each histogram in the plurality of histograms is associated with a different logical volume.

2. A method of prefetching data from a storage device comprising:

maintaining a history of sequences;

determining an amount of data to be prefetched from a storage device for a new I/O request using the history of sequences, the history of sequences comprising at least one histogram and the at least one histogram includes n count fields each for storing a count value for a corresponding sequence length in a range of 1 track to n tracks, the count value indicating a number of occurrences of sequences of the corresponding sequence length; and the at least one histogram comprising a plurality of histograms and each histogram in the plurality of histograms is associated with a different logical volume.

3. The method of claim 2, wherein n is equal to 8.

4. The method of claim 2, wherein maintaining comprises:

observing completion of a sequence of a given sequence length; and incrementing the count value in any of the count fields for which the corresponding sequence length is less than or equal to the given sequence length.

5. A storage controller comprising:

a memory;

data structures stored in the memory, the data structures comprising a plurality of histograms to provide a history of sequences, each histogram in the plurality of histograms being associated with a different logical volume and including n count fields each for storing a count value for a corresponding sequence length in a range of 1 track to n tracks, the count value indicating a number of occurrences of sequences of the corresponding sequence length; and a processor, coupled to the memory, operable to determine an amount of data to be prefetched from a logical volume for a new I/O request using the histogram associated with such logical volume.

6. The storage controller of claim 5, wherein the processor is operable to maintain the history of sequences by observing completion of a sequence of a given sequence length and incrementing the count value in any of the count fields for which the corresponding sequence length is less than or equal to the given sequence length.

7. The storage controller of claim 5, wherein, to determine the amount of data to be prefetched, the processor is operable to predict that a current sequence of a current sequence length will reach a next sequence length by computing a probability equal to a ratio of the count value for the corresponding sequence length that equals the next consecutive sequence length and count value for the corresponding sequence length that equals the current sequence length.

8. A method of prefetching data from a storage device comprising:

maintaining a history of sequences;

determining an amount of data to be prefetched from a storage device for a new I/O request using the history of sequences, the history of sequences comprising at least one histogram and the at least one histogram includes n count fields each for storing a count value for a corresponding sequence length in a range of 1 track to n tracks, the count value indicating a number of occurrences of sequences of the corresponding sequence length; and predicting that a current sequence of a current sequence length will reach a next sequence length by computing a probability equal to a ratio of the count value for the corresponding sequence length that equals the next consecutive sequence length and count value for the corresponding sequence length that equals the current sequence length.

9. The method of claim 8, wherein maintaining comprises:

observing completion of a sequence of a given sequence length; and incrementing the count value in any of the count fields for which the corresponding sequence length is less than or equal to the given sequence length.

10. The method of claim 8, wherein determining comprises:

applying a threshold to the prediction.

11. The method of claim 10, wherein determining further comprises:

establishing the threshold by setting to a configurable parameter.

12. The method of claim 10, wherein applying further comprises:

comparing the threshold to the prediction; and determining if the probability is less than the threshold.

13. The method of claim 12, wherein determining further comprises:

repeating predicting and applying for each next sequence length until it is determined for such next sequence length that the probability is less than the threshold; and returning a prefetch amount equal to such next sequence length minus the current sequence length when the results of the comparison indicate that the probability is less than the threshold.

14. The method of claim 12, wherein determining comprises:

adjusting the threshold based on system activity metrics.

15. The method of claim 14, wherein the system activity metrics include processor utilization.

16. The method of claim 15, wherein the system activity metrics include average memory access time.

17. The method of claim 16, wherein adjusting comprises:

setting the threshold to a predetermined maximum value if the process utilization exceeds a maximum allowed utilization level; and otherwise, setting the threshold based on the average access time.

18. The method of claim 17, wherein setting the threshold based on the average access time comprises:

setting the threshold to a minimum threshold value if the average access time is less that a lower average access time threshold and setting the threshold to the maximum threshold if the average access time is greater than an upper average access time threshold;

otherwise, setting the threshold to a value computed using the minimum threshold, the maximum threshold and the average access time.

* * * * *

UNITED STATES PATENT AND TRADEMARK OFFICE
CERTIFICATE OF CORRECTION

PATENT NO. : 6,721,870 B1
DATED : April 13, 2004
INVENTOR(S) : Yechiel Yochai et al.

It is certified that error appears in the above-identified patent and that said Letters Patent is hereby corrected as shown below:

Column 7,
Line 54, reads "then the J" and should read -- then the results --.

Column 8,
Line 50, reads "prefetch." and should read -- prefetch --.

Signed and Sealed this

Sixth Day of July, 2004

JON W. DUDAS
*Acting Director of the United States Patent and Trademark Office*